Jan. 1, 1929.                    H. DRUSCH                    1,697,497
                              RIP SAWING MACHINE
                              Filed Nov. 23, 1927

Inventor
Hermann Drusch
By Adam E. Fisher
      Attorney

Patented Jan. 1, 1929.

1,697,497

UNITED STATES PATENT OFFICE.

HERMANN DRUSCH, OF MORGAN, MINNESOTA.

RIPSAWING MACHINE.

Application filed November 23, 1927. Serial No. 235,213.

This invention pertains to rip sawing machinery, and the main object is to provide a machine of this class wherein any common hand rip saw may be employed.

Another object is to provide a simple, practical and efficient form of sawing machine, wherein are embodied mechanical elements adapted to operatively engage a common hand saw, such as a rip saw, for the purpose of employing such saw in the ripping up of timbers into the form of boards or strips.

In the drawing

Figure 1:
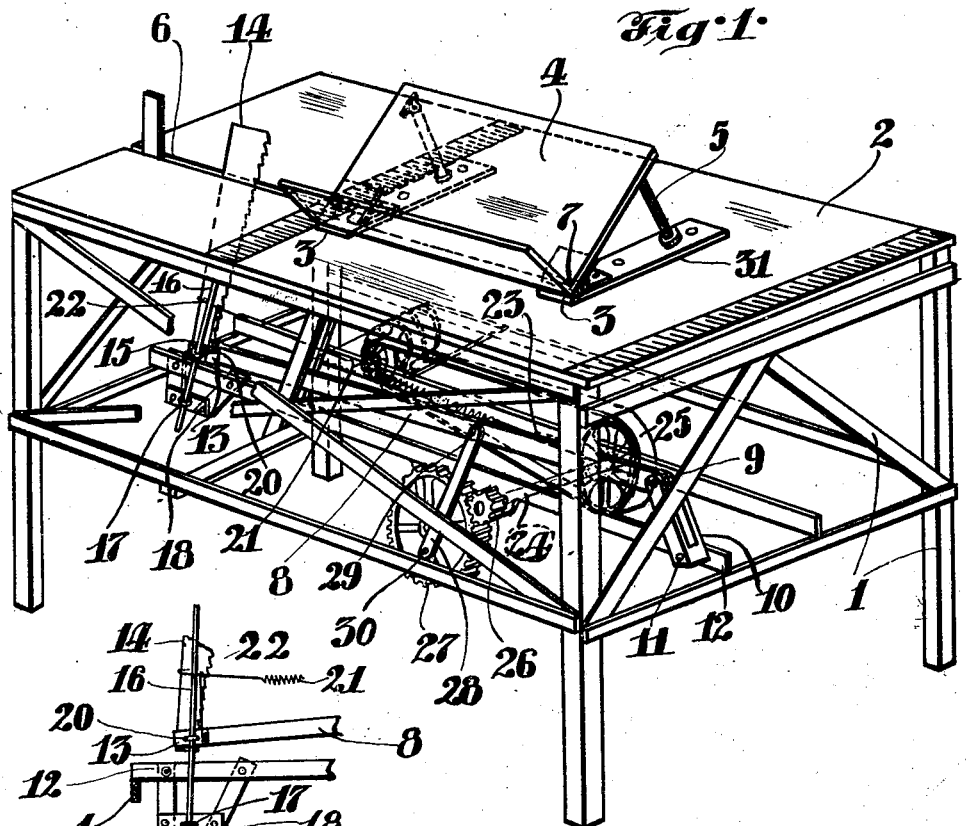
Figure 1 is a perspective view of the assembly.
Figures 2, 3, 4:
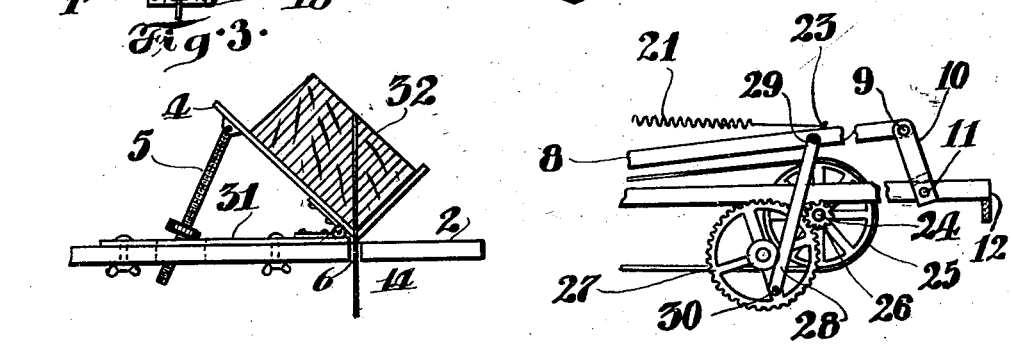
Figure 2 is a detail of the timber or work holder.
Figure 3 is a detail of the forward end of the saw lever and connections.
Figure 4 is a detail of the rear portion of the saw lever and connections.

The invention comprises a suitable supporting frame 1 carrying the operating or top board 2 upon which are adjustably positioned foot boards 31 and to which boards is hingedly mounted at 3 a work holder 4 positioned longitudinally of the board 2 and having the adjustment screws 5 whereby the holder 4 may be tilted to any required angle.

The board 2 is provided with a saw slot 6 extended longitudinally of the board and in alignment with the angle 7 of the holder 4. This slot 6 does not extend under the member 4, but stops at the forward end thereof. A saw lever 8 is longitudinally mounted in the lower part of the frame 1, the rear end thereof being pivotally pinned at 9 to the upper end of a short rock arm 10, the latter being in turn pivotally pinned at 11 to a cross piece 12 of the frame. The forward end of the lever 8 is forked as shown at 13 and a rip saw 14 is pivotally secured at its lower end within this fork as indicated at 15, while the upper or working end of the saw projects upwardly through the slot 6. A semi-flexible saw guide rod 16 is passed thru an eye 17 set in the extension 18 of the frame 1. The rod 16 is just sufficiently flexible to accommodate the arcuate travel of the forward end of the saw lever 8 where it is attached to the saw blade. The upper portion of the rod 16 is then passed slidably through an eye 20 extended from the forked end 13 of the lever 8 and is extended upwardly in substantial parallel relation to the saw 14. A retractile coil spring 21 is connected at 22 with the saw 14, while its opposite end is connected at 23 with a rearward portion of the bar 8. The action of the spring 21 is thus normally to draw the saw 14 forwardly against the work. A shaft 24 is journaled transversely in the frame 1, a power pulley wheel 25 being rigidly mounted at one end and a pinion gear 26 at the opposite end. The pinion 26 meshes with a master gear 27 which is suitably journaled in the frame 1. A crank lever 28 is pivotally pinned at 29 to the saw lever 8, while its lower end is pivotally connected to the crank pin 30 extended from the gear 27. Any conventional form of safety device (not shown) may be incorporated in the assembly to relieve the saw of the strain of the driving power, in case the said saw should become stuck in the work.

In operation the timber 32 is properly positioned upon the holder 4 and properly aligned with the saw 14. Power being then applied through the pulley 25, the resulting action is to reciprocate the saw 14, thereby causing it to cut through the timber 32. Inasmuch as the saw cannot cut the portion of the timber resting upon the holder 4, this end of the timber may be cut off transversely after the longitudinal cuts are completed, whereupon the longitudinal sawed strips will fall apart.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A sawing machine comprising a supporting frame, a longitudinally saw-slotted top board on the frame, a rock arm vertically and pivotally mounted in the rear portion of the frame, a saw lever pivotally attached at its rear end to the upper end of the rock arm and having its forward end longitudinally extended through the frame and positioned beneath the said saw slot, a saw blade vertically passed through the said saw slot, with its lower end pivotally connected with the forward end of the said saw lever, and means for reciprocating the said saw lever.

2. A sawing machine comprising a supporting frame a longitudinally saw slotted top board on the frame, a rock arm vertically and pivotally mounted in the rear portion of the frame, a saw lever pivotally attached at its rear end to the upper end of the rock arm and having its forward end longitudinally extended through the frame and positioned beneath the said saw slot, a saw blade vertically passed through the said saw slot, with its lower end pivotally connected with the forward end of the said saw lever, and a vertically disposed saw guide having its lower end connected with an eye set in an extension of the frame and its upper portion passed slidably through an eye in the forward end of the saw lever and disposed in parallel relation with the said saw, and means for reciprocating the said saw lever.

In testimony whereof I affix my signature.

HERMANN DRUSCH.